US009666084B2

(12) United States Patent
Shapiro et al.

(10) Patent No.: US 9,666,084 B2

(45) Date of Patent: May 30, 2017

(54) DISPLAY AND CONTROL OF TIME EVOLVED CONDITIONS RELATIVE TO A VEHICLE

(71) Applicant: Rockwell Collins, Inc., Cedar Rapids, IA (US)

(72) Inventors: Geoffrey A. Shapiro, Cedar Rapids, IA (US); Kevin M. Kronfeld, Cedar Rapids, IA (US); Jason C. Wenger, Cedar Rapids, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 187 days.

(21) Appl. No.: 14/578,243

(22) Filed: Dec. 19, 2014

(65) Prior Publication Data

US 2016/0180718 A1 Jun. 23, 2016

(51) Int. Cl.

| | |
|---|---|
| ***G01C 21/12*** | (2006.01) |
| ***G01S 13/00*** | (2006.01) |
| ***G01C 21/00*** | (2006.01) |
| ***G08G 5/00*** | (2006.01) |

(52) U.S. Cl.

CPC ......... *G08G 5/0047* (2013.01); *G08G 5/0021* (2013.01); *G08G 5/0039* (2013.01); *G08G 5/0091* (2013.01)

(58) Field of Classification Search

USPC ......................... 701/418; 342/26 B; 340/971

See application file for complete search history.

(56) References Cited

U.S. PATENT DOCUMENTS

| | | | | |
|---|---|---|---|---|
| 5,867,804 A * | 2/1999 | Pilley | G01C 23/00 | 340/961 |
| 6,977,608 B1 * | 12/2005 | Anderson | G01C 21/16 | 340/945 |
| 7,546,206 B1 * | 6/2009 | Miller | G01C 21/00 | 701/120 |
| 7,982,658 B2 * | 7/2011 | Kauffman | G01S 13/953 | 342/26 B |
| 9,243,922 B2 * | 1/2016 | Watts | G01C 21/3407 | |
| 2004/0181340 A1 * | 9/2004 | Smith | G08B 21/10 | 702/3 |
| 2006/0015254 A1 * | 1/2006 | Smith | H04W 4/02 | 702/3 |

(Continued)

*Primary Examiner* — Tyler Paige

(74) *Attorney, Agent, or Firm* — Angel N. Gerdzhikov; Donna P. Suchy; Daniel M. Barbieri

(57) ABSTRACT

Methods and systems for identifying and displaying potentially hazardous segments on a planned route of a vehicle are disclosed. A method may include: predicting a movement of a condition of concern; analyzing the movement of the condition of concern and a movement of a vehicle traveling along a planned route to generate a projection of the condition of concern onto the planned route, wherein the projection indicates conditions the vehicle is predicted to encounter at a plurality of positions along the planned route; determining whether a portion of the planned route is potentially hazardous based on the projection of the condition of concern; and visually identifying the portion of the planned route that is potentially hazardous to a user. The method may also be utilized to facilitate a reroute process.

19 Claims, 18 Drawing Sheets

(56) References Cited

U.S. PATENT DOCUMENTS

| | | | | |
|---|---|---|---|---|
| 2008/0021648 | A1* | 1/2008 | Wilson | G08G 1/0969 701/301 |
| 2008/0180282 | A1 | 7/2008 | Brosius | |
| 2008/0208474 | A1* | 8/2008 | Wilson | G06N 7/00 702/3 |
| 2012/0235410 | A1* | 9/2012 | Serrano | B64B 1/50 290/50 |
| 2013/0080043 | A1* | 3/2013 | Ballin | G08G 5/0034 701/120 |
| 2013/0226452 | A1* | 8/2013 | Watts | G01C 21/3407 701/528 |
| 2013/0325325 | A1 | 12/2013 | Djugash | |
| 2015/0360566 | A1* | 12/2015 | Bas Gago | G01W 1/10 340/971 |

* cited by examiner

DISPLAY AND CONTROL OF TIME EVOLVED CONDITIONS RELATIVE TO A VEHICLE

BACKGROUND

A vehicle may encounter potentially hazardous conditions while traveling. For example, an aircraft may encounter a weather condition that may affect the flight of the aircraft. In certain cases, the weather condition may pose a threat to the existing flight path and a safe reroute may be necessary.

SUMMARY

In one aspect, the inventive concepts disclosed herein are directed to a method. The method may include: predicting a movement of a condition of concern; analyzing the movement of the condition of concern and a movement of a vehicle traveling along a planned route to generate a projection of the condition of concern onto the planned route, wherein the projection indicates conditions the vehicle is predicted to encounter at a plurality of positions along the planned route; determining whether a portion of the planned route is potentially hazardous based on the projection of the condition of concern; and visually identifying the portion of the planned route that is potentially hazardous to a user.

Some embodiments of the inventive concepts disclosed herein may include additional steps to selectively displaying a predicted location of the condition of concern based on a specified time reference or a visual representation of the projection indicating conditions the vehicle is predicted to encounter at the plurality of positions along the planned route.

A further embodiment of the inventive concepts disclosed herein is directed to a system. The system may include a processor and a display device. The processor may be configured to: predict a movement of a condition of concern; analyze the movement of the condition of concern and a movement of a vehicle traveling along a planned route to generate a projection of the condition of concern onto the planned route, wherein the projection indicates conditions the vehicle is predicted to encounter at a plurality of positions along the planned route; and determine whether a portion of the planned route is potentially hazardous based on the projection of the condition of concern. The display device may be configured to display a graphical representation to a user, wherein the graphical representation may include a visual indication of the portion of the planned route that is potentially hazardous and one of: a predicted location of the condition of concern based on a specified time reference or a visual representation of the projection indicating conditions the vehicle is predicted to encounter at the plurality of positions along the planned route.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Weather related delays are one of the greatest contributors to delays within the airspace system. Pilots are often faced with highly dynamic weather related hazards, which may require tactical and strategic reroutes while in flight. Pilots may attempt to use information obtained from uplinked and/or on-board weather radar to estimate the track and intensity of a weather condition (e.g., a storm) and plot a path around it. Such a process is highly operator-dependent and requires the pilot to have sufficient meteorological experiences. As a result, late reroutes, multiple corrections and longer diversions may occur.

Embodiments of the inventive concepts disclosed herein provide various options for displaying time evolved hazards such as weather conditions relative to a vehicle. For instance, a weather condition that may be encountered in the future can be detected and graphically presented to the pilot in the context of the planned flight path. The pilot may also utilize the graphical interface to effectively plan a different route around the weather condition.

It is contemplated that while weather conditions are referenced in the examples described herein, such references are merely exemplary. Embodiments of the inventive concepts disclosed herein may be applicable to various other types of conditions that an aircraft may encounter, such as icing, turbulence, traffic conditions or flight restrictions, which may also be graphically presented and handled in a similar manner. It is also contemplated that embodiments of the inventive concepts disclosed herein may be applicable to various other types of vehicles, including land-based vehicles, maritime vehicles and/or space vehicles without departing from the broad scope of the inventive concepts disclosed herein.

Figure 1:
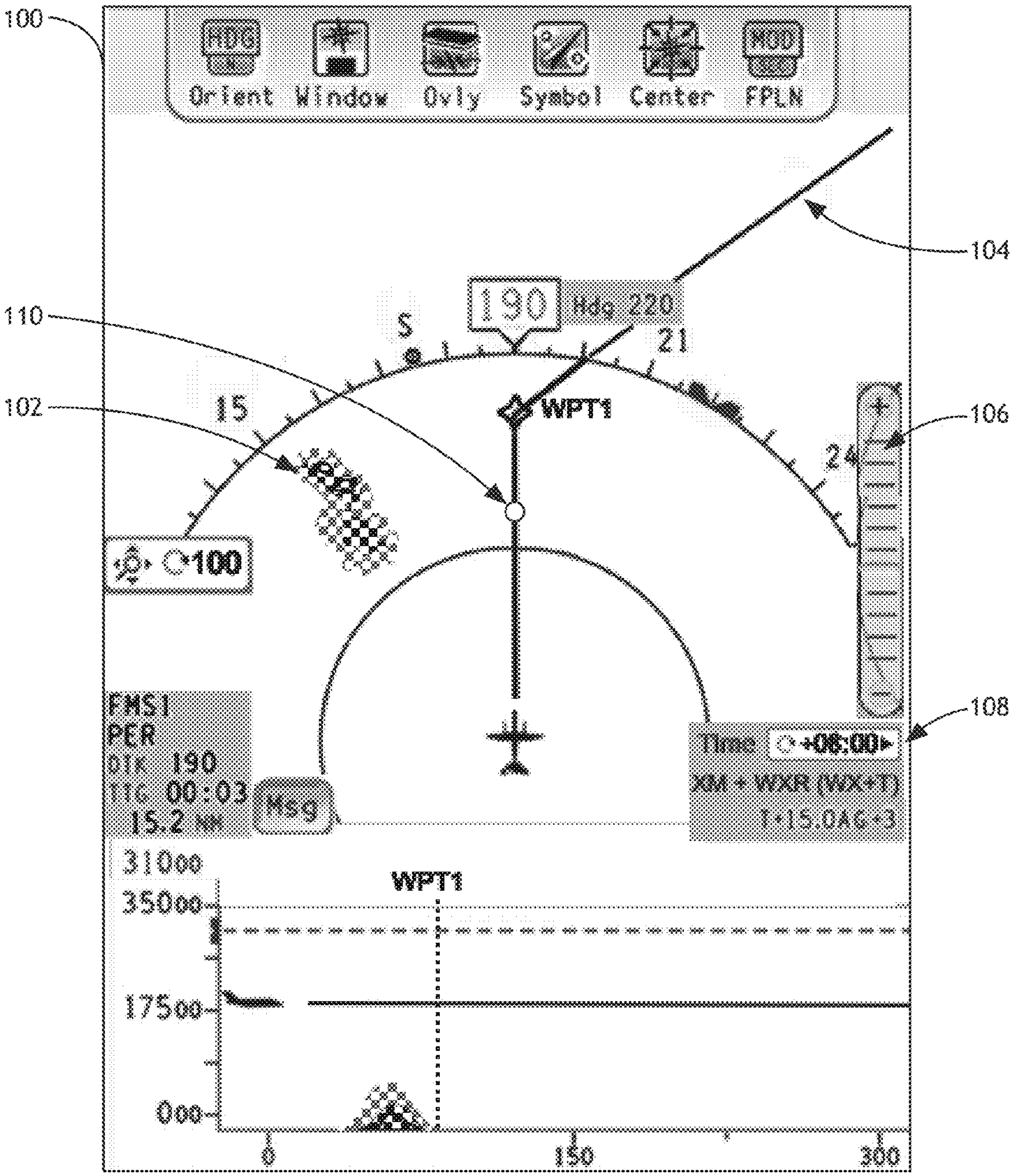
FIG. 1 is an illustration depicting a time-adjustable graphical representation for displaying a time evolved condition (e.g., a weather hazard) and a flight path.
Figure 2:
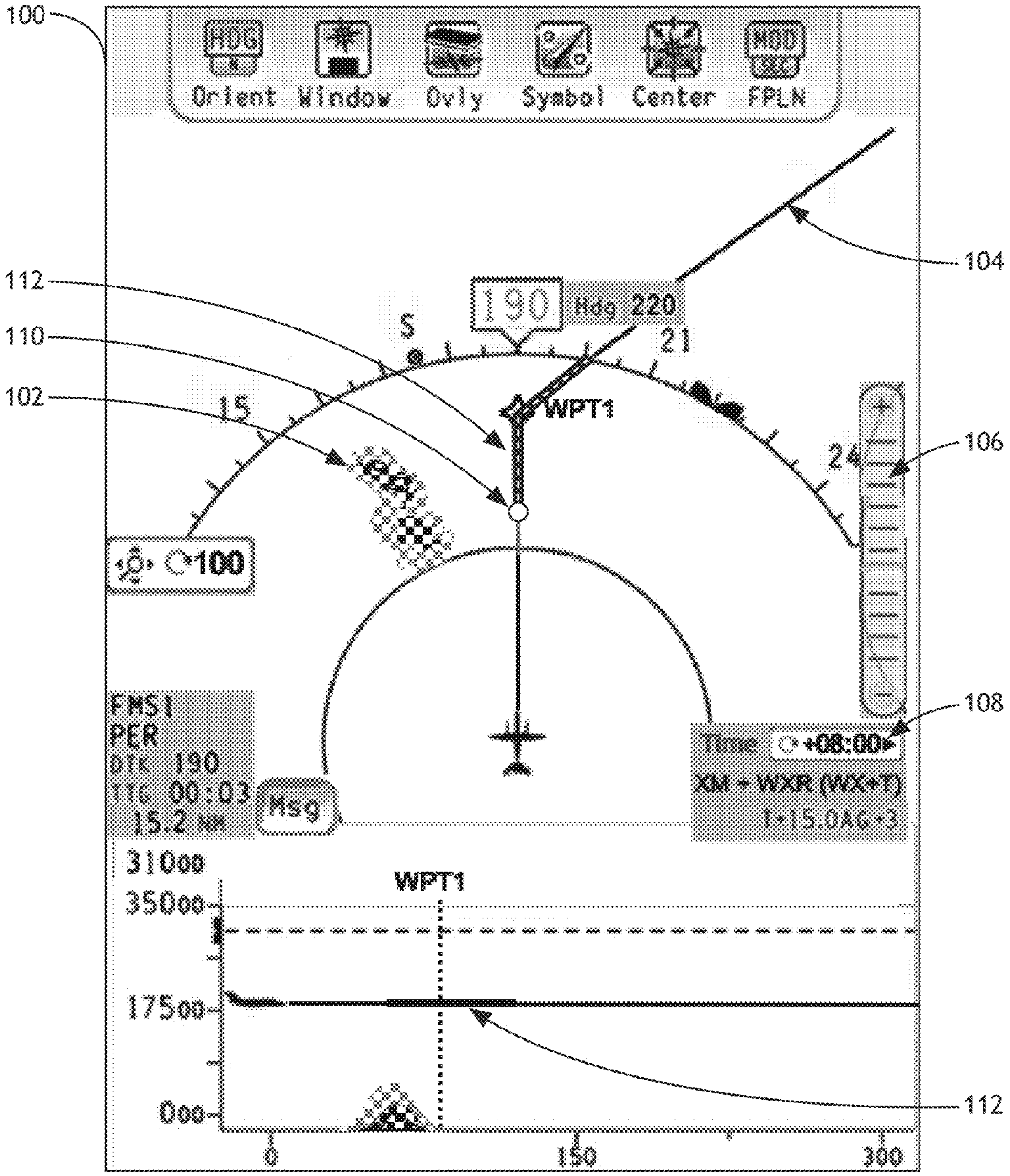
FIG. 2 is an illustration depicting the time-adjustable graphical representation for displaying a weather hazard and a flight path, wherein a segment of the flight path is identified as hazardous.

Referring to FIGS. 1 and 2, illustrations depicting a time-adjustable graphical representation 100 for displaying a time evolved condition 102 (e.g., a weather hazard) in context with a planned route 104 is shown. In general, pilots are instructed to establish safe clearances around weather hazards. For example, a pilot may be instructed to establish a minimum separation (laterally and/or vertically) from the weather hazard. It is contemplated that various types of weather threats/hazards prediction systems, such as those described in: Storm Top Detection and Prediction, U.S. Pat. No. 7,714,767, and in: System and Method for Determining an Object Threat Level, U.S. Pat. No. 8,600,587, which are herein incorporated by reference in their entireties, may be utilized to detect the weather hazard. The time-adjustable graphical representation 100 may be utilized to assist the pilot (may also be referred to as a user) to visualize whether safe clearances can be maintained and identify any potential conflicts that may occur in the future as the weather hazard 102 evolves.

More specifically, a user interface for adjusting a time reference is provided. In some embodiments, a time reference slider 106 is utilized as an exemplary user interface. Alternatively and/or additionally, a text field 108 may also be utilized to display and/or receive time reference adjustments. It is contemplated that user input may be received via a touch screen interface, a keyboard interface, a turn knob interface, as well as various other types of input devices without departing from the broad scope of the inventive concepts disclosed herein.

In the example shown in FIG. 1, the time reference is set to +8:00, indicating that the user wants to view the predicted position of the weather hazard 102 eight minutes into the future. Accordingly, the predicted position of the weather hazard 102 eight minutes into the future is depicted in the time-adjustable graphical representation 100. The predicted position 110 of the aircraft eight minutes into the future may also be indicated as a reference point.

In accordance with embodiments of the inventive concepts disclosed herein, if the weather hazard 102 is predicted to cause some potential conflicts with the planned route 104 (e.g., less than a minimum separation is predicted to exist between the weather hazard 102 and the planned route 104 at some point during the flight of the aircraft), warning indicators may be displayed to inform the user of such potential conflicts.

In some embodiments, one or more segment of the planned route 104 that may be in a potential hazardous area of the weather hazard 102 at a specific time in the predictable future may be identified. For instance, a hazardous segment may include any point along the planned route 104 that is within a certain lateral distance (e.g., 10 nautical miles) or within a certain vertical distance (e.g., 5000 feet) away from the weather hazard 102 when the aircraft travels through that point. Referring to the example shown in FIG. 2, segment 112 of the planned route 104 is indicated as one such hazardous segment. It is noted that even though certain portions of the hazardous segment 112 may appear to be more than the required distances away from the predicted position of the weather hazard 102 in this particular figure (which depicts the weather hazard 102 eight minutes into the future), such portions are still indicated as hazardous because they are predicted to be within the potential hazardous area of the weather hazard 102 at a later time as the weather hazard 102 evolves and as the aircraft travels according to the flight plan. In other words, the potential hazardous segments along the planned route 104 are identified by taking into account the movement of the aircraft and the time evolved nature of the weather hazard 102. The detailed steps for identifying potential hazardous segments 112 along a particular route will be described later.

In some embodiments, the identified hazardous segments 112 may be displayed in a visually differentiable manner with respect to the other parts of the route 104. For example, different texture, color, line width, or various other types of visually differentiable features may be utilized to distinguish the identified hazardous segments 112 from other parts of the planned route 104. It is contemplated that various methods and systems may be utilized to assist avoidance of the identified hazardous segments 112, such as those described in: Method and Apparatus for Guiding an Aircraft Through a Cluster of Hazardous Areas, U.S. Pat. No. 6,744, 38, in: Method and Apparatus for Identification of Hazards Along an Intended Travel Route, U.S. Pat. No. 6,577,947, and in: Weather Radar System and Method with Fusion of Multiple Weather Information Sources, U.S. patent application Ser. No. 14/465,753, which are herein incorporated by reference in their entireties.

In some embodiments, the time-adjustable graphical representation 100 may be configured to support user adjustments of the time reference within a predefined time range. For instance, the user adjustable time reference may range between −20:00 minutes and +20:00 minutes, wherein a negative time reference may prompt a display of historical data (e.g., sensed or observed weather information) and a positive time reference may prompt a display of predicted data. Alternatively and/or additionally, the time-adjustable graphical representation 100 may support an animated display mode wherein the display loops between a start time (e.g., +00:00) and an end time (e.g., +20:00) based on a given increment value (e.g., 1 minute). It is contemplated that the time-adjustable graphical representation 100 may also provide the user options to pause the animation and switch between animated and manual mode.

Figure 3:
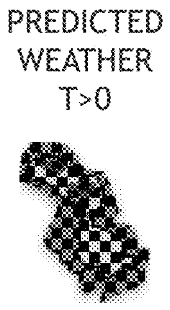
FIG. 3 is an illustration depicting an exemplary visual indication of a predicated condition.
Figure 4:
FIG. 4 is an illustration depicting an exemplary visual indication of a sensed condition.

It is also contemplated that predicted information may be presented in a visually differentiable manner with respect to actual data. For instance, as depicted in FIGS. 3 and 4, weather information may be shown in at least two different formats to clearly annunciate the difference between predictions and sensed/observed weather. Formats may differ in texture, shape, color, transparency, or a combination thereof. In addition, it is noted that prediction accuracy may decrease as time advances into the future, and in some embodiments, prediction accuracy associated with a particular condition may be visually indicated in the time-adjustable graphical representation 100.

Figure 5:
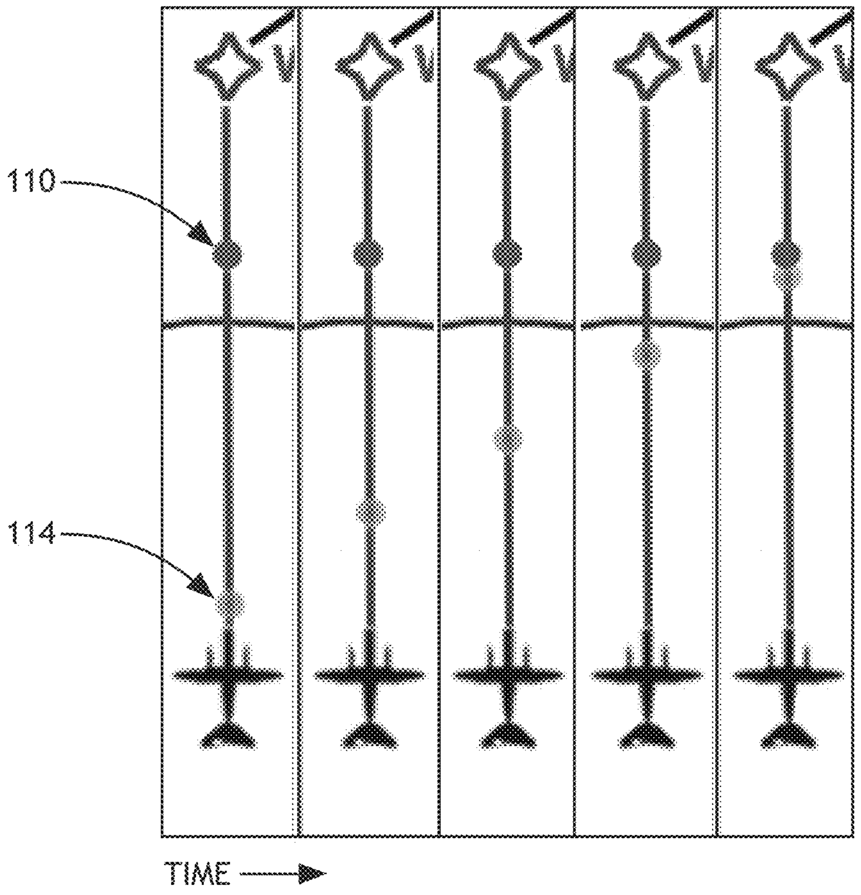
FIG. 5 is an illustration depicting an exemplary visual indication of a viewing mode.

Furthermore, it is contemplated that additional visual indicators may be utilized to serve as a reminder when the time-adjustable graphical representation 100 is displaying predicted future information. For instance, as depicted in FIG. 5, a symbol 114 may continuously move from the current aircraft position indicator (e.g., the aircraft icon) towards the predicated future aircraft position 110. Because the predicated future aircraft position 110 and the moving symbol 114 can only appear when the time reference set by the user is greater than 0:00, the appearance of this moving of the symbol 114 may effectively serve as a reminder to the user that predicted information is being displayed, mitigating potential user confusion regarding actual and predicted information. It is to be understood that other visual indicators may also be utilized to serve this purpose. For example, different font, background color, as well as various other indicators may be utilized when displaying predicted information without departing from the broad scope of the inventive concepts disclosed herein.

In addition to providing an easily understandable graphical representation for the user to visually recognize potential effects of a temporal hazard on the planned route 104, the time-adjustable graphical representation 100 may also be utilized as a reroute-assist tool to help the user to steer around the weather hazard while taking the time-evolved nature of the weather hazard 102 into consideration.

Figure 6:
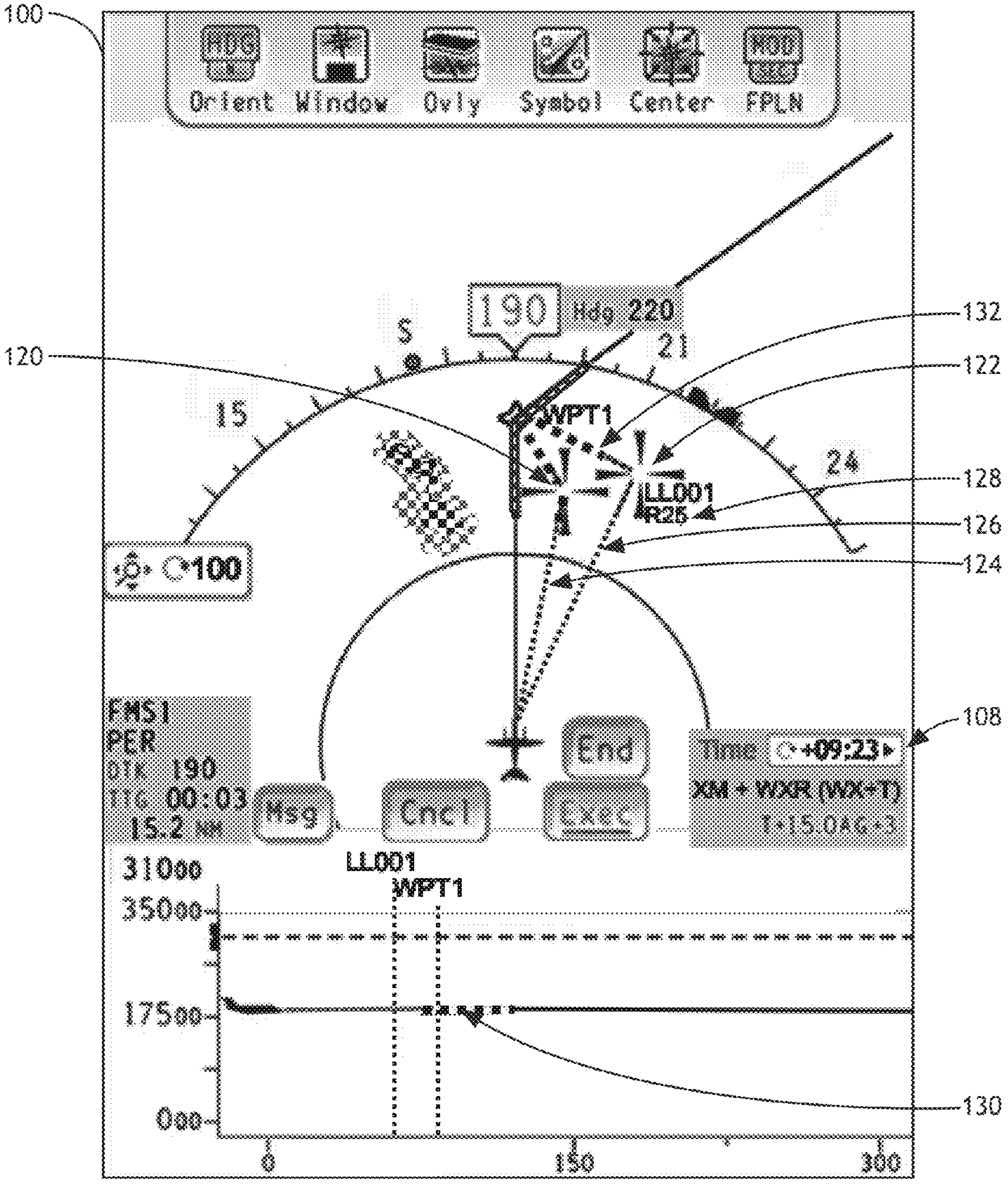
FIG. 6 is an illustration depicting a waypoint-based reroute process utilizing the time-adjustable graphical representation.

FIG. 6 is an illustration depicting a reroute process utilizing the time-adjustable graphical representation 100. Once the reroute process is initiated, the user may select one or more alternative waypoints as potential reroute options, and the time-adjustable graphical representation 100 may visually indicate to the user whether the reroute options are hazardous or not. For example, the user may select a first waypoint 120 for consideration. The waypoint 120 may be selected based on a cursor location, which may be received via a touch screen interface, a keyboard interface, a turn knob interface, as well as various other types of input devices. It is noted that the user may also change the waypoint selection. For example, the user may select another waypoint 122 for consideration, which will replace the first waypoint 120. It is noted that both waypoints 120 and 122 are shown in FIG. 6 merely to illustrate the dynamic behavior when the user selects different waypoints. It is to be understood that only one of the waypoints 120 and 122 and its associated route may be shown at a given moment in operation.

Upon receiving the first waypoint 120, a first alternative route 124 may be calculated and displayed. It is noted that the time reference displayed in the text field 108 may be updated accordingly. That is, the position of the first waypoint 120 may drive the time frame, and based on the position of the waypoint 120 and the current position of the aircraft, the time needed to travel to the waypoint 120 may be calculated and displayed accordingly. In addition, all time based elements (e.g., predicted position of the weather hazard 102) may be synchronized to the updated time reference accordingly.

Similar to the hazardous segment identification process previously described, one or more hazardous segment that may exist on the first alternative route 124 may be identified and displayed. In the example depicted in FIG. 6, a portion of the first alternative route 124 between the current position of the aircraft and the first waypoint 120 is still identified as hazardous, indicating to the user that deviating to the first waypoint 120 still does not provide sufficient clearance with respect to the weather hazard 102. The user may then select a second waypoint 122 for further consideration.

Upon receiving the second waypoint 122, the first waypoint 120 and the first alternative route 124 may be cleared from the display, and a second alternative route 126 may be calculated and displayed instead. It is noted that the time reference displayed in the text field 108 may be updated again, and all time based elements (e.g., predicted position of the weather hazard 102) may be synchronized again to the updated time reference.

As shown in the example depicted in FIG. 6, the second waypoint 122 is moved farther from the weather hazard 102, and a portion of the second alternative route 126 that is determined to be hazardous is updated accordingly in both the lateral view 132 and the vertical view 130. It is noted that the segment along the second alternative route 126 from the current position of the aircraft to the second waypoint 122 is no longer a part of the updated hazardous segment of the second alternative route 126. It is also noted that additional information such as heading differences and updated leg time may also be displayed to aid communication with air traffic control. For example, if the segment along the second alternative route 126 towards the second waypoint 122 requires a heading change of 25 degrees right from the current heading, a text field 128 may be displayed to inform the user about the changes. It is further noted that this reroute process also merges heading based legs (e.g., for deviations) with track based legs (e.g., waypoint track paths) that are typically used by traditional flight management systems. Providing the abilities to merge heading based legs with track based legs allow the user to deviate using headings while continue using track based flight management systems.

Figure 7:
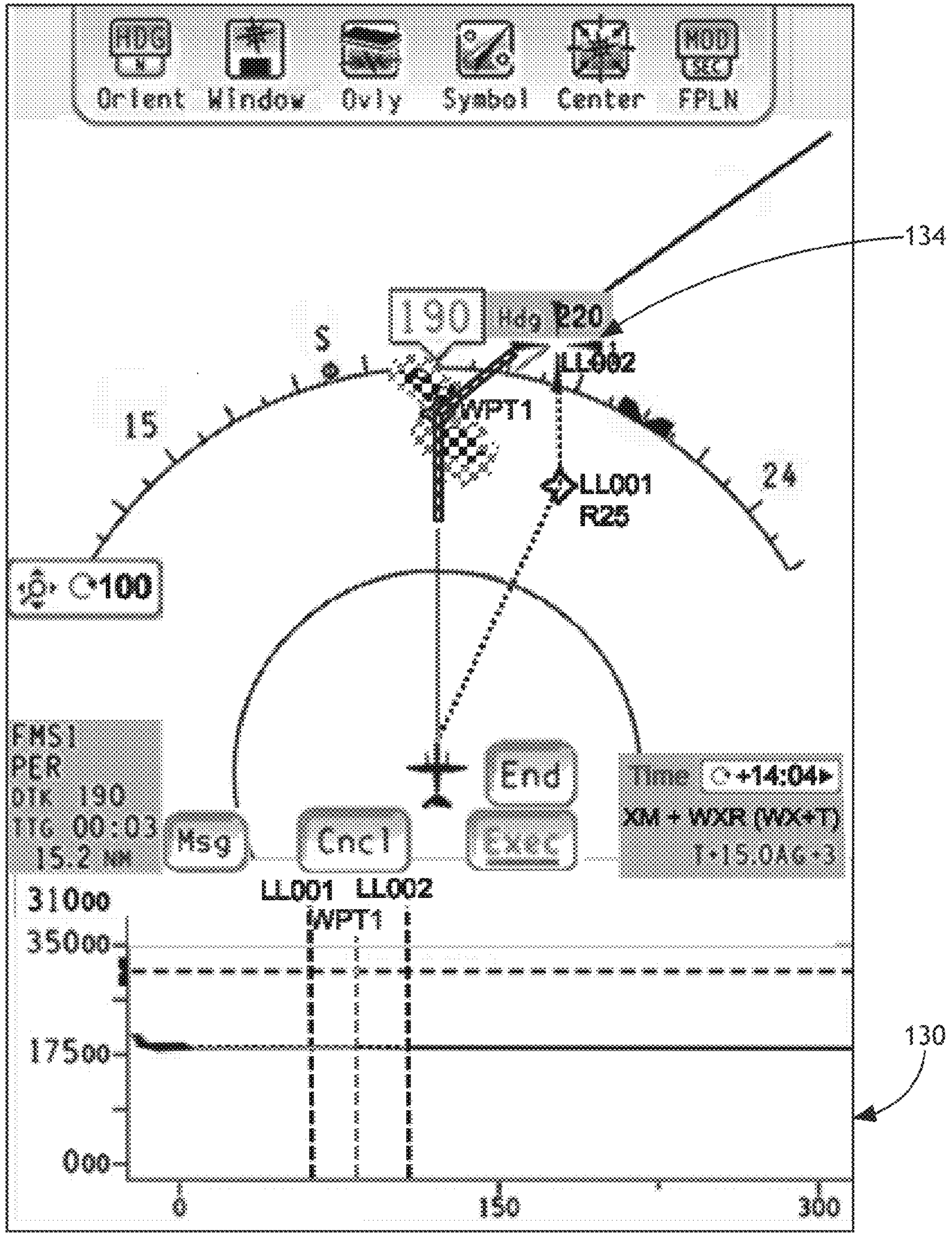
FIG. 7 is another illustration depicting the waypoint-based reroute process utilizing the time-adjustable graphical representation.

The user may continue to select alternative waypoints for consideration and may continue to interact with the time-adjustable graphical representation 100 in a similar manner as described above. The user may also tentatively commit to waypoint 122 and continue to select a subsequent waypoint(s) that eventually rejoins the original planned route 104. For example, the user may select a waypoint 134 as depicted in FIG. 7. Based on the position of the waypoint 134 and the current position of the aircraft, the time needed to fly through all tentatively committed waypoints (waypoint 122 in this example) to get to waypoint 134 may be calculated and displayed. In addition, all time based elements (e.g., predicted position of the weather hazard 102) may be synchronized to the updated time reference.

It is noted that the new route through waypoint 122 and rejoining the original planned route 104 at waypoint 134 is predicted to be completely free of hazardous segments. The user may commit to this new route and complete the reroute process.

It is contemplated that a vertical deviation over or below the weather hazard 102 may be selected utilizing a vertical situation display presented on the vertical view 130 in a similar manner. More specifically, instead of selecting a new waypoint to create a new route and avoid a predicted condition, a new altitude may be selected for avoidance of a growing or decaying weather hazard. Similarly, a new route may include a new planned speed to help avoiding the weather hazard.

Figure 8:
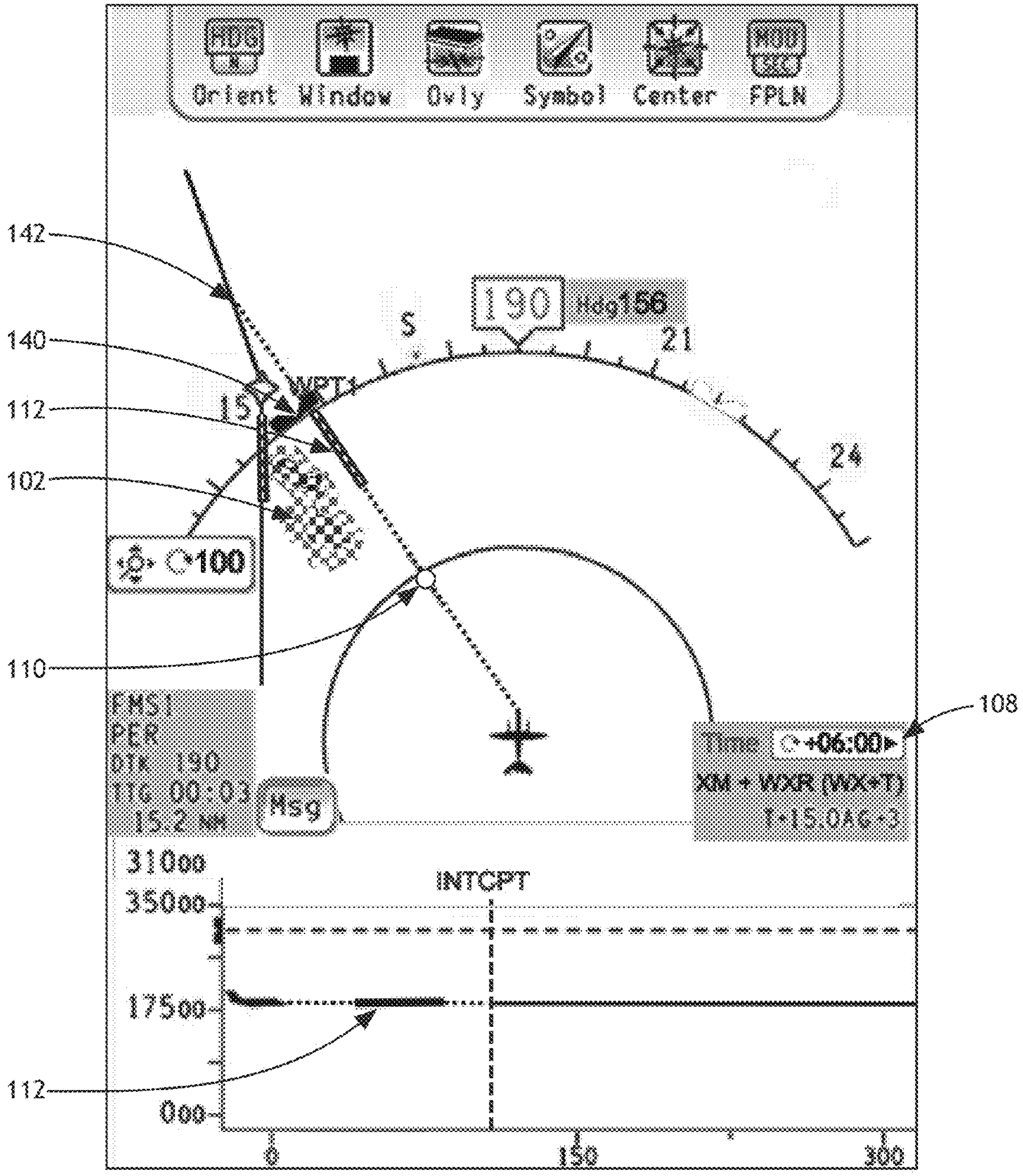
FIG. 8 is an illustration depicting a heading-based reroute process utilizing the time-adjustable graphical representation.

It is also contemplated that in addition (or alternative) to the waypoint-based routing process described above, the time-adjustable graphical representation 100 may also support a heading-based routing process as depicted in FIG. 8. When using the heading-based routing process, the user may adjust the targeted heading indicator 140, and a ground track prediction 142 may be calculated based upon the targeted heading and wind conditions. It is noted that the predicted ground track 142 and the targeted heading indicator 140 may not align if crosswind is present.

Similar to the time reference adjustment processed previously described, the user may set the time reference to, for example, +6:00, indicating that the user wants to view the predicted position of the weather hazard 102 six minutes into the future. Accordingly, the predicted position of the weather hazard 102 six minutes into the future is depicted, as well as the predicted position 110 of the aircraft. If the weather hazard 102 is predicted to cause some potential conflicts with one or more segment 112 of the ground track prediction 142, such a segment 112 may be identified and visually indicated to the user as described above.

Figure 9:
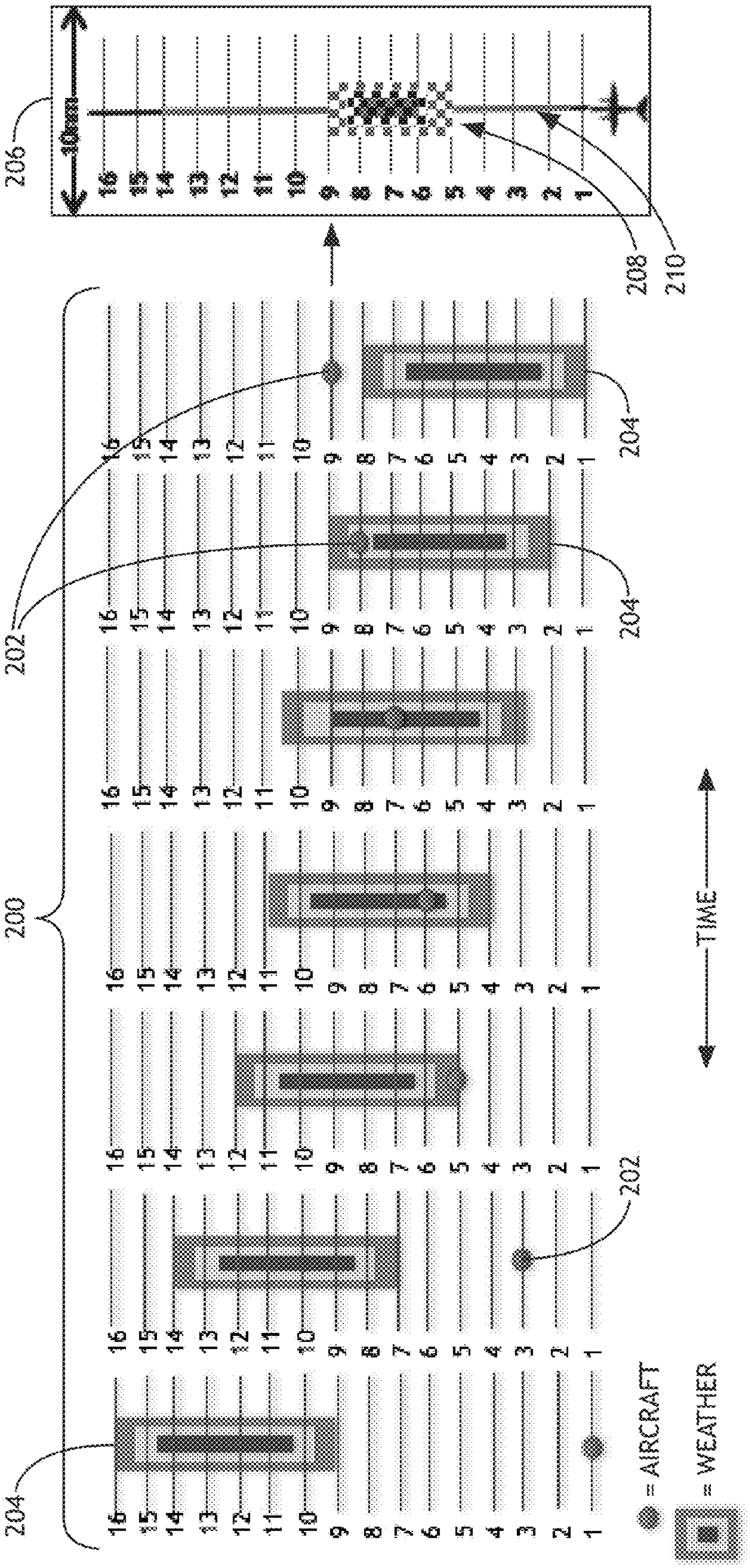
FIG. 9 is an illustration depicting projection of a time evolved condition onto a flight path.
Figure 10:
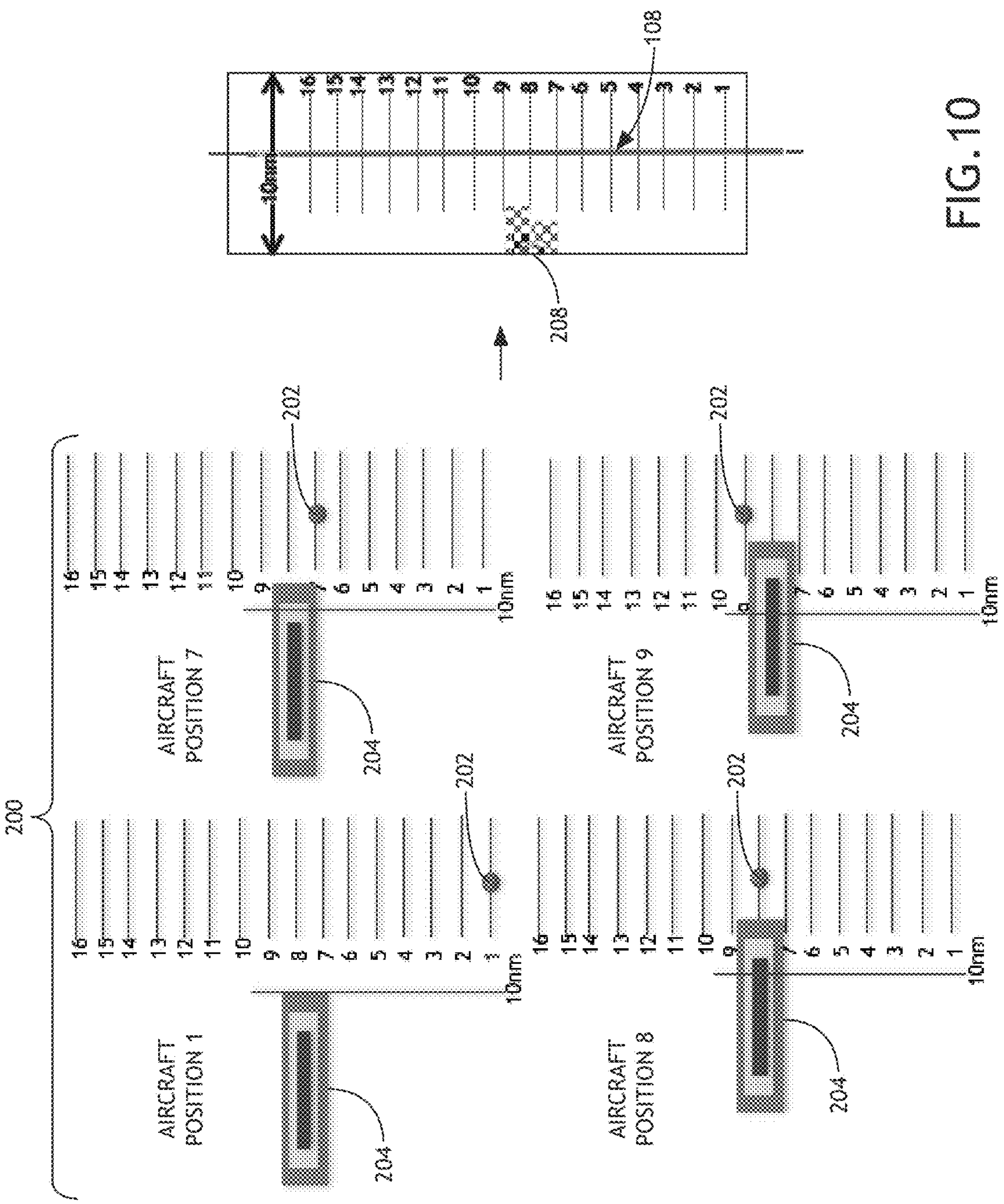
FIG. 10 is another illustration depicting projection of a time evolved condition onto a flight path.

It is also contemplated that in addition to the time-adjustable graphical representation 100 as described above, wherein a time reference is utilized to control the visualization of the time evolved condition 102, a space-time consolidated graphical representation may be utilized to provide an alternative (or an additional) visualization of the time evolved condition 102. FIGS. 9 and 10 are some exemplary illustrations depicting this space-time consolidation process.

FIG. 9 includes a series 200 of simplified depictions of relative positions between a weather condition 204 and an aircraft 202. This type of depiction is similar to the time-adjustable graphical representation 100 described above, wherein a particular time reference corresponds to a depiction of the relative position between the weather condition 204 and the aircraft 202 for that particular time. Also included in FIG. 9 is a space-time consolidated graphical representation 206 that represents the entire series 200 projected onto the planned route 210 of the aircraft 202 in a single representation.

More specifically, in the example shown in FIG. 9, the aircraft 202 is not expected to encounter the weather condition 204 as the aircraft travels from position 1 through position 5, and therefore, no weather information is projected onto the planned route 210 from position 1 through position 5 in the consolidated graphical representation 206. It is noted that the aircraft 202 is predicted to encounter a relatively mild weather condition as the aircraft 202 first starts to cross path with the weather condition 204 at positions 5 and 6, and this information is reflected in the consolidated graphical representation 206. Similarly, it is noted that the aircraft 202 is predicted to encounter a relatively severe weather condition 204 as the aircraft 202 continues to cross path with the weather condition 204 between positions 6 and 8, and this severity information is also reflected in the consolidated graphical representation 206. This consolidation process may be applied in a similar manner to the rest of the positions, resulting in the consolidated graphical representation 206, which depicts a consolidated weather pattern 208 that is projected along the planned route 210. It is noted that the consolidated weather pattern 208 is not a simple weather forecast; instead, the consolidated weather pattern 208 depicts the weather conditions that may be encountered by the aircraft 202 if the aircraft 202 travels through the planned route 210. It is noted that any portion(s) of the planned route 210 that is within the minimum separation distance from the consolidated weather pattern 208 may be identified as a part of the hazardous segment. This process for identifying hazardous segments may be utilized for identifying hazardous segments in the time-adjustable graphical representation 100 as well. FIG. 10 represents a scenario similar to FIG. 9 except in this scenario the weather condition 204 is traversing horizontally relative to the planned route of the aircraft 202.

In some embodiments, weather conditions may be clipped to a band (e.g., 10 nautical miles) around the aircraft 202 to reduce the amount of information that needs to be processed and displayed in the consolidated graphical representation 206. For instance, weather conditions that are projected to be more than 10 nautical miles away from the aircraft 202 may not be of a particular concern, and may therefore be excluded from the consolidated graphical representation 206. It is to be understood that clipping at 10 nautical miles is merely exemplary. That is, the consolidated graphical representation 206 may be configured to depict the projection of the consolidated weather pattern 208 within a certain distance around the planned route 210. It is to be understood that the distance may also change depending on whether the aircraft 202 is above or below a certain altitude. For instance, in some embodiments, the distance may be set to 10 nautical miles on either side of the planned route 210 when the aircraft 202 is at or above 20,000 ft, and 5 nautical miles when the aircraft 202 is below 20,000 ft. It is to be understood that the lateral and/or vertical distances may vary without departing from the broad scope of the inventive concepts disclosed herein. It is also to be understood that the specific number of positions (e.g., 1 through 16) depicted in FIGS. 9 and 10 are merely exemplary for illustrative purposes. It is contemplated that the granularity of this consolidated graphical representation 206 may vary without departing from the broad scope of the inventive concepts disclosed herein.

Figure 11:
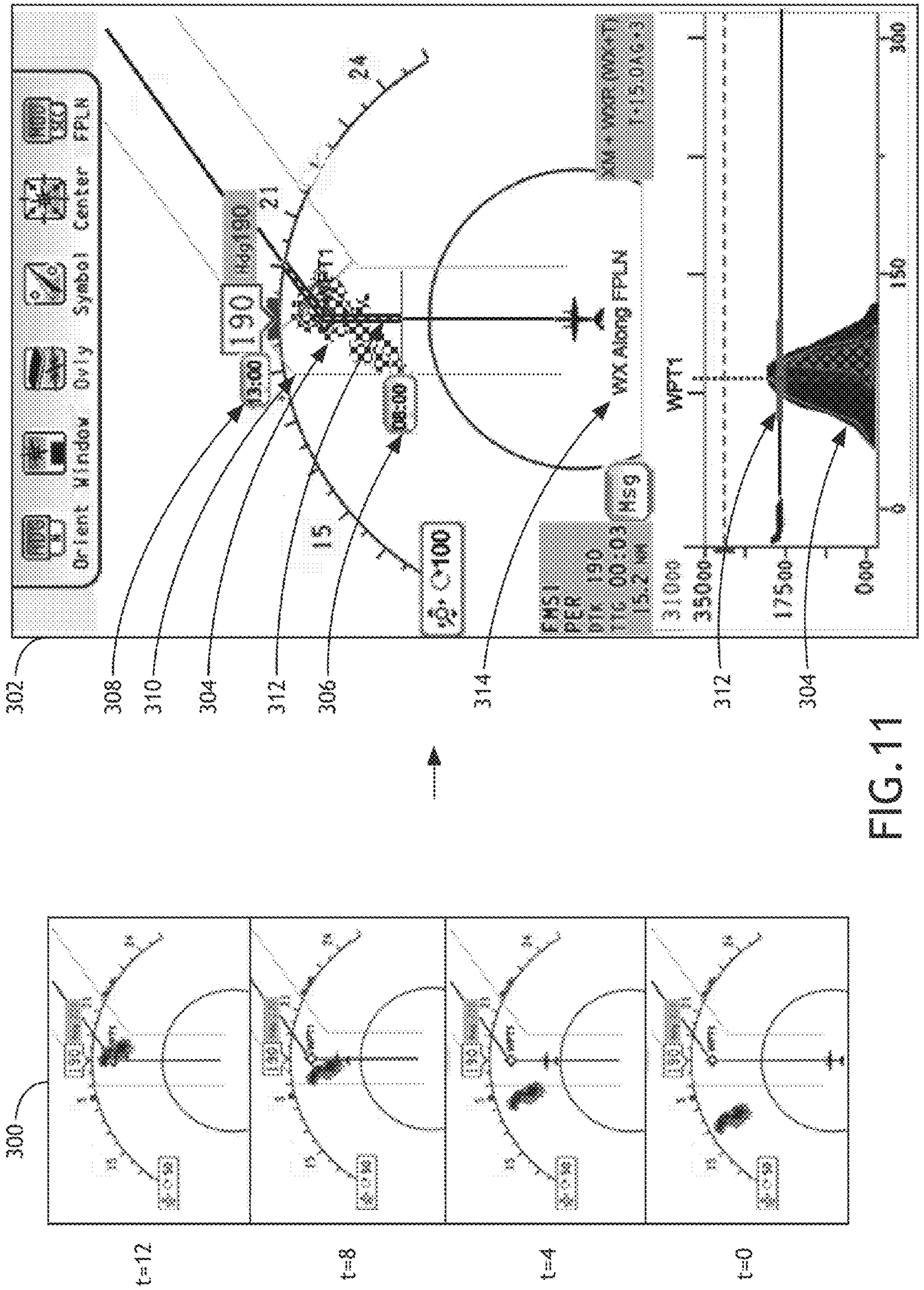
FIG. 11 is an illustration depicting a space-time consolidated graphical representation for displaying a projection of a time evolved condition onto a flight path.

FIG. 11 further illustrates the consolidated graphical representation for displaying weather information. The series of images 300 represents the position of a weather condition at various time references. The consolidated graphical representation 302 consolidates the series of images 300 and displays a projection of the weather condition 304 along a planned route based on the relative movements of the aircraft and the weather.

It is contemplated that additional information may also be provided on the consolidated graphical representation 302. For example, one or more predicted time frames 306 and 308 may be calculated and displayed. These predicted time frames 306 and 308 not only provide timing information to the user, but may also serve as an interface to switch to the time-adjustable graphical representation 100 previously described. For example, the user may view the consolidated graphical representation 302 at a glance, and then use the time frame 306 to switch to the time-adjustable graphical representation 100 that defaults the time reference to +8:00. The user may interact with the time-adjustable graphical representation 100 as previously described, and switch back to the consolidated graphical representation 302 as needed. In some embodiments, a mode indicator 314 may be utilized to indicate whether the current display is in the space-time consolidated graphical representation 302 or the time-adjustable graphical representation 100. The ability to switch between the space-time consolidated graphical representation 302 and the time-adjustable graphical representation 100 may be beneficial and may further facilitate the decision making process.

It is contemplated that hazardous segment(s) 312 may be identified utilizing the identification process as previously described. Furthermore, the weather condition may be clipped to a band around the aircraft as previously described.

In some embodiments, clipping bars 310 are set to 10 nautical miles on either side of the planned route when the aircraft is at or above 20,000 ft, and 5 nautical miles when the aircraft is below 20,000 ft. It is contemplated that these parameters are user configurable and may vary without departing from the broad scope of the inventive concepts disclosed herein. In some embodiments, the minimum separation is configurable based upon airline operation preferences in addition to user/operator preferences.

Figure 12:
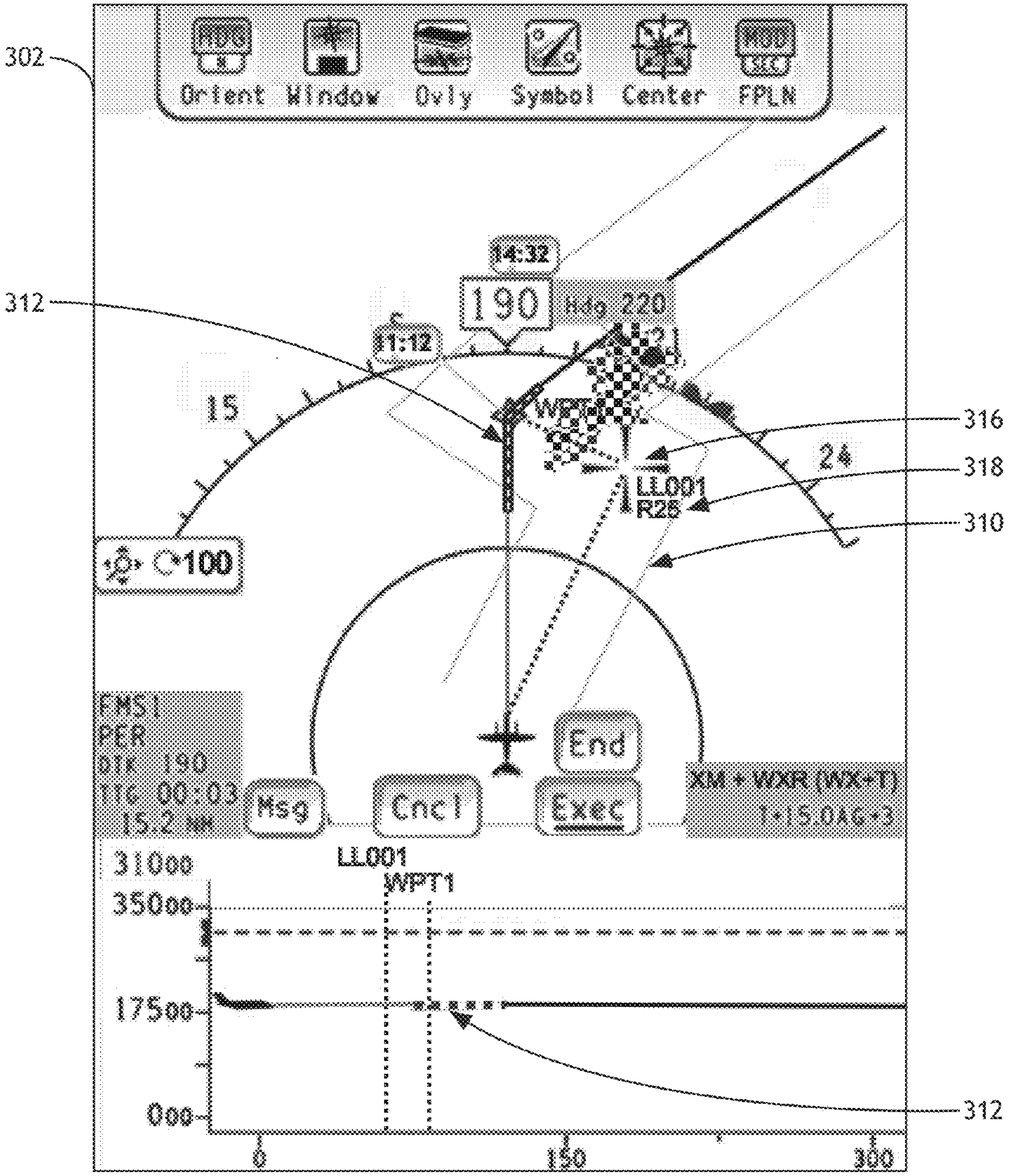
FIG. 12 is an illustration depicting a waypoint-based reroute process utilizing the space-time consolidated graphical representation.

It is further contemplated that the consolidated graphical representation 302 may also be utilized to assist a reroute process and help the user to steer around the weather hazard. FIG. 12 is an illustration depicting a reroute process utilizing the consolidated graphical representation 302. For example, the user may select a waypoint 316 for consideration. Upon receiving the waypoint 316, a predicted path may be calculated and displayed. It is noted that deviating to the waypoint 316 changes the travel time, and all time based elements (e.g., the projection of the weather condition with respect to the new route) may be calculated and updated accordingly. It is noted that changes to information such as the clipping bars 310 and heading changes 318 may also be displayed.

Figure 13:
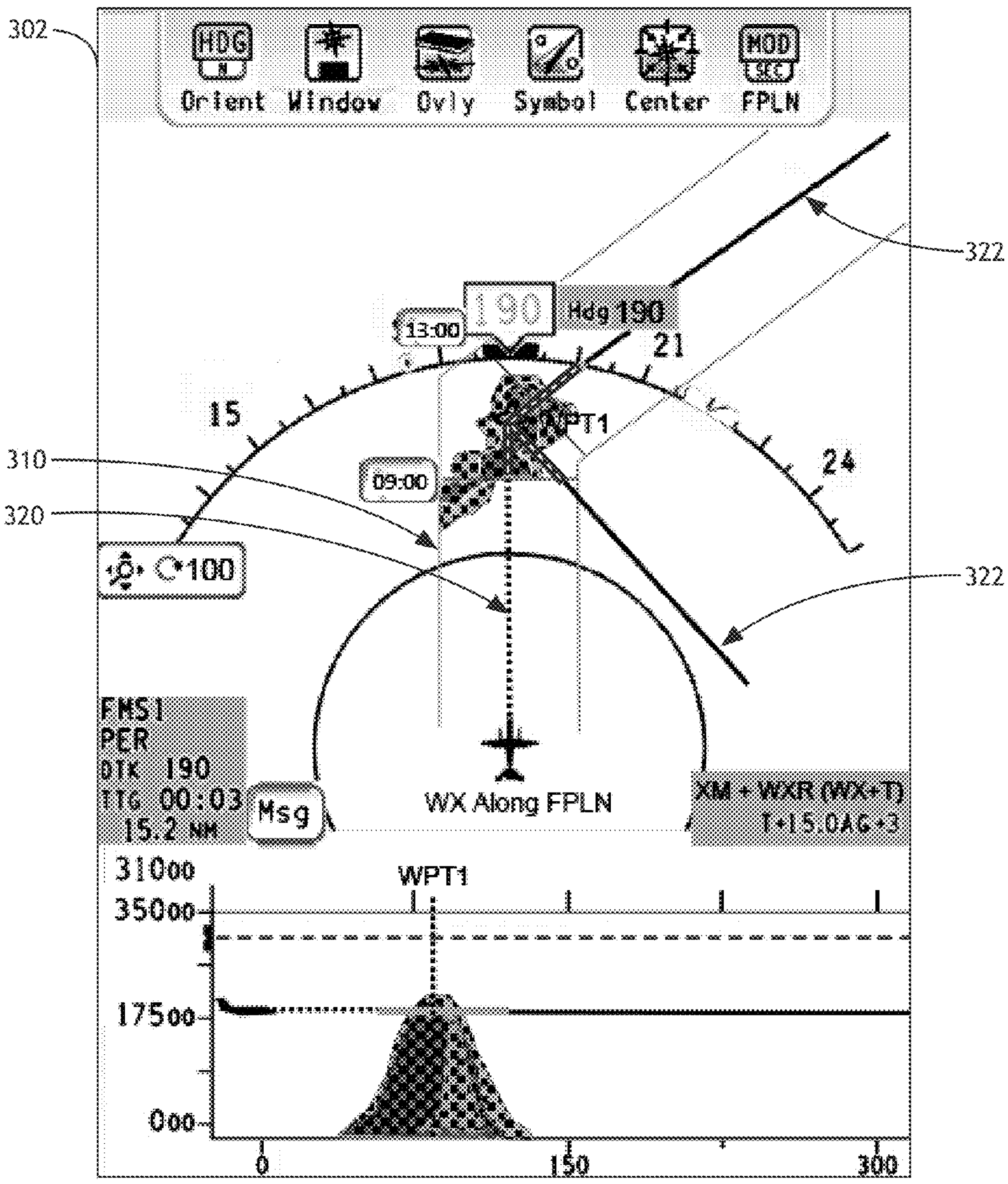
FIG. 13 is an illustration depicting a heading-based reroute process utilizing the space-time consolidated graphical representation.

The consolidated graphical representation 302 may also be utilized in a heading display mode as depicted in FIG. 13. In the heading display mode, a ground track prediction 320 is calculated based on aircraft heading and wind conditions. It is noted that the ground track prediction 320 and the heading indicator may not align if crosswind is present. It is also noted that in the heading display mode, the projected weather condition and the clipping bars 310 may follow the ground track prediction 320 instead of the original planned flight path. In the event that the ground track prediction 320 intercepts the original planned route 322, the clipping bars 312 may follow the original planned route 322 after the intersection as shown in FIG. 13.

Figure 14:
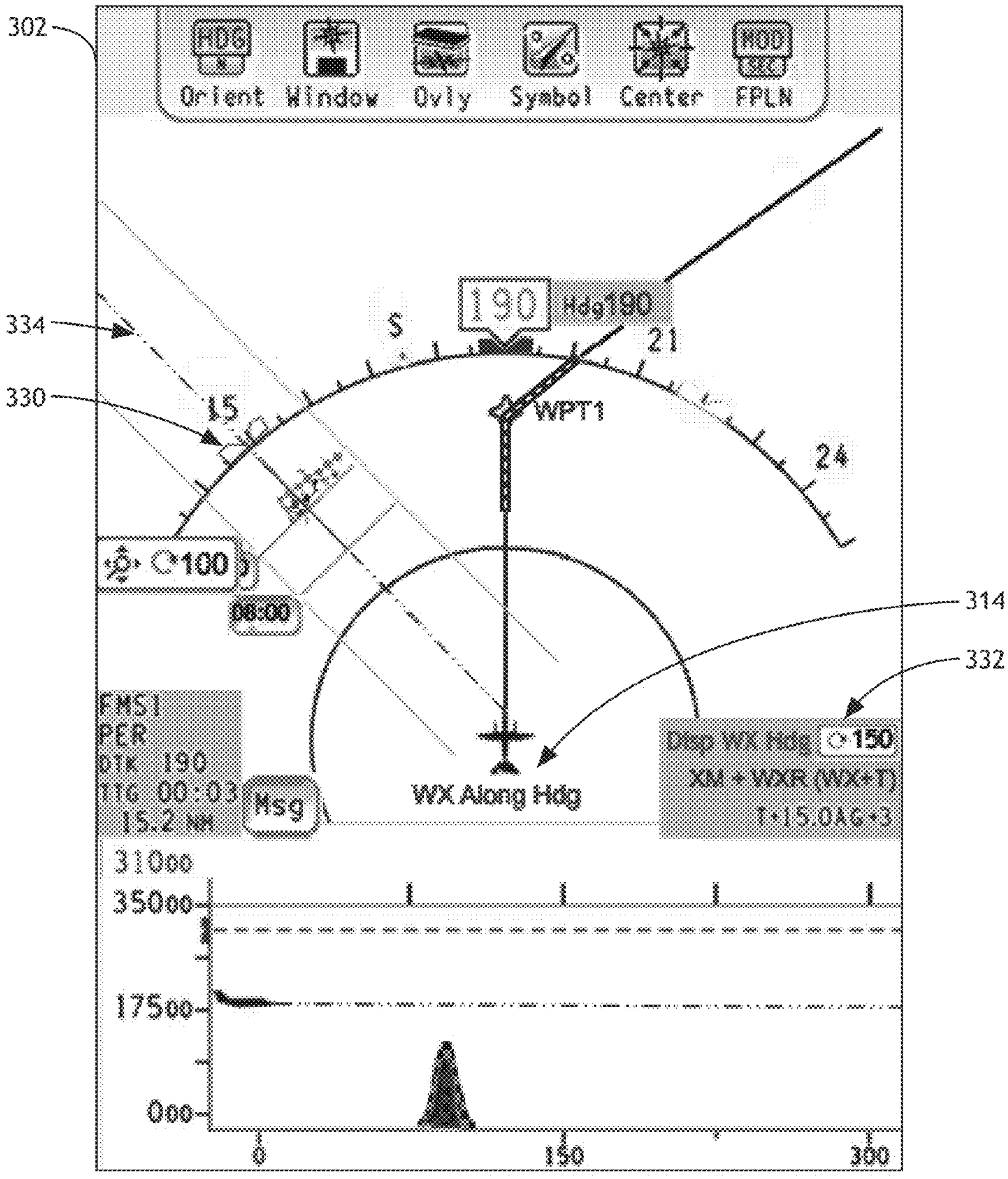
FIG. 14 is an illustration depicting a heading-based preview mode utilizing the space-time consolidated graphical representation.

The consolidated graphical representation 302 may also be utilized in a heading-based preview mode as depicted in FIG. 14. In the heading-based preview mode, the user may enter a new heading for preview purposes utilizing a heading preview indicator 330 or a text field 332. It is contemplated that user input may be received via a touch screen interface, a keyboard interface, a turn knob interface, as well as various other types of input devices without departing from the broad scope of the inventive concepts disclosed herein. In some embodiments, the mode indicator 314 may be utilized to indicate that the current display is in the heading-based preview mode.

Upon receiving a new heading 330 in the heading-based preview mode, a ground track prediction 334 may be calculated and displayed accordingly. Any weather conditions the ground track prediction 334 is projected to encounter may be identified and displayed in the space-time consolidated manner. The ability to provide such a space-time consolidated weather projection for each previewed heading 330 is beneficial because it presents the projected weather conditions to the user in a concise manner. The user may continue to change the heading 330 and preview weather conditions to decide whether to make any heading changes.

Figure 15:
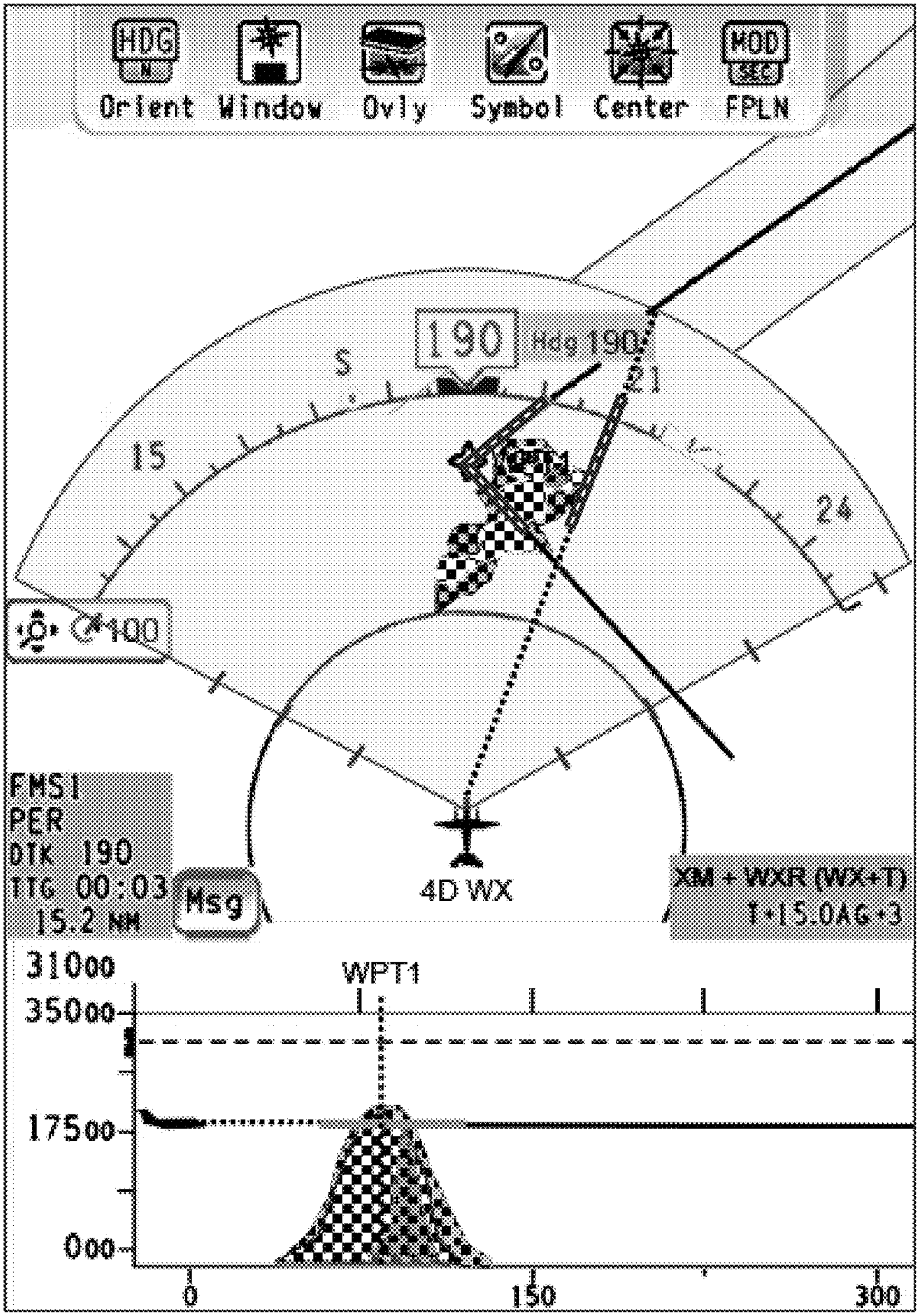
FIG. 15 is an illustration depicting an arc representation.
Figure 16:
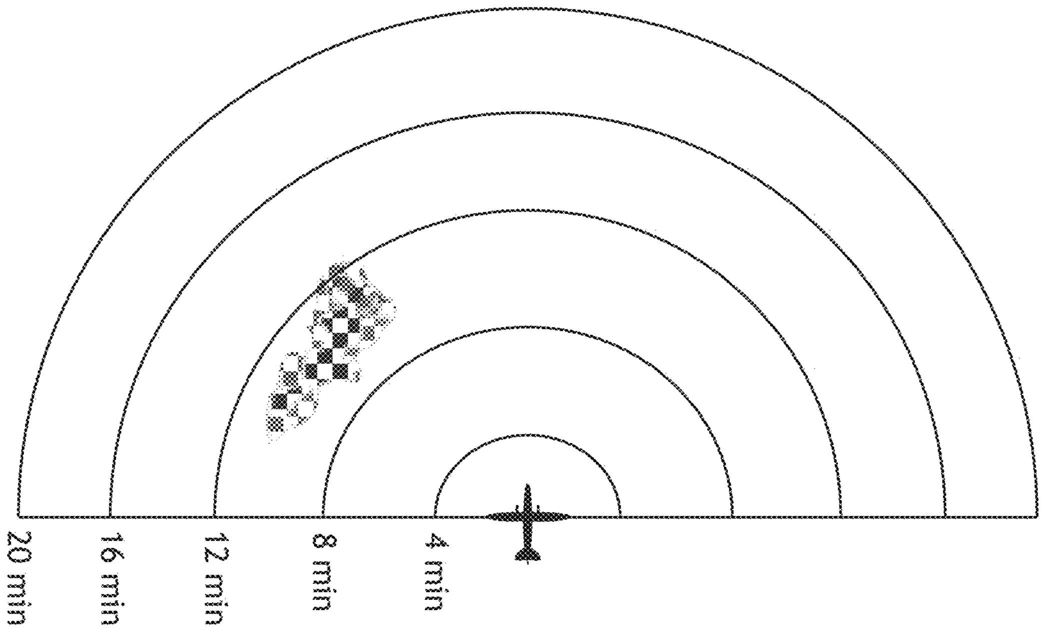
FIG. 16 is an illustration depicting generation of an arc representation.
Figure 17:
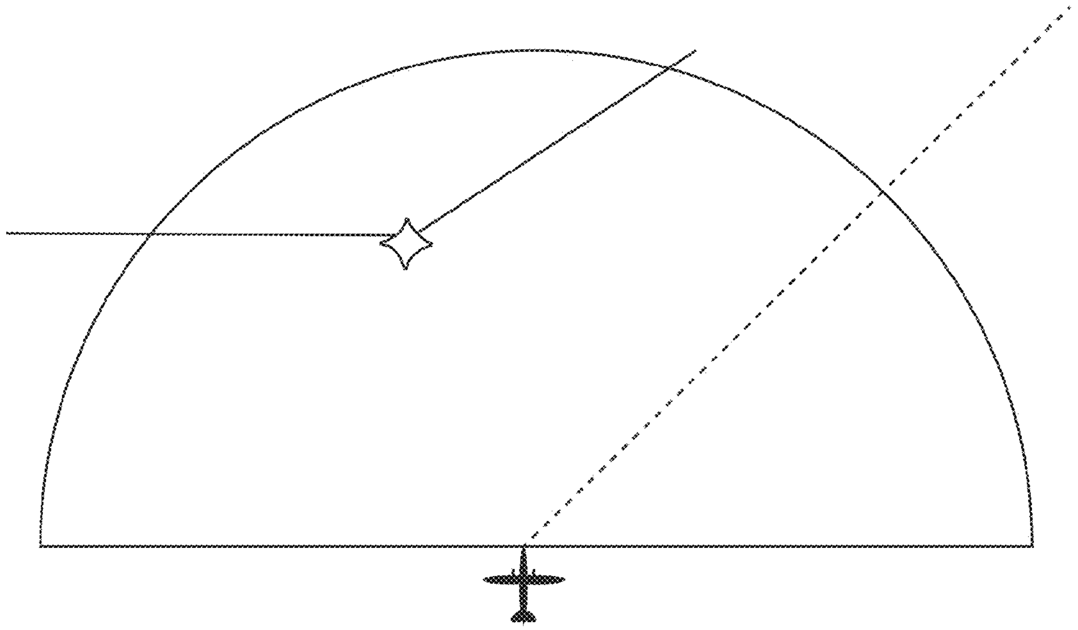
FIG. 17 is an illustration depicting an arc representation with a planned route.
Figure 18:
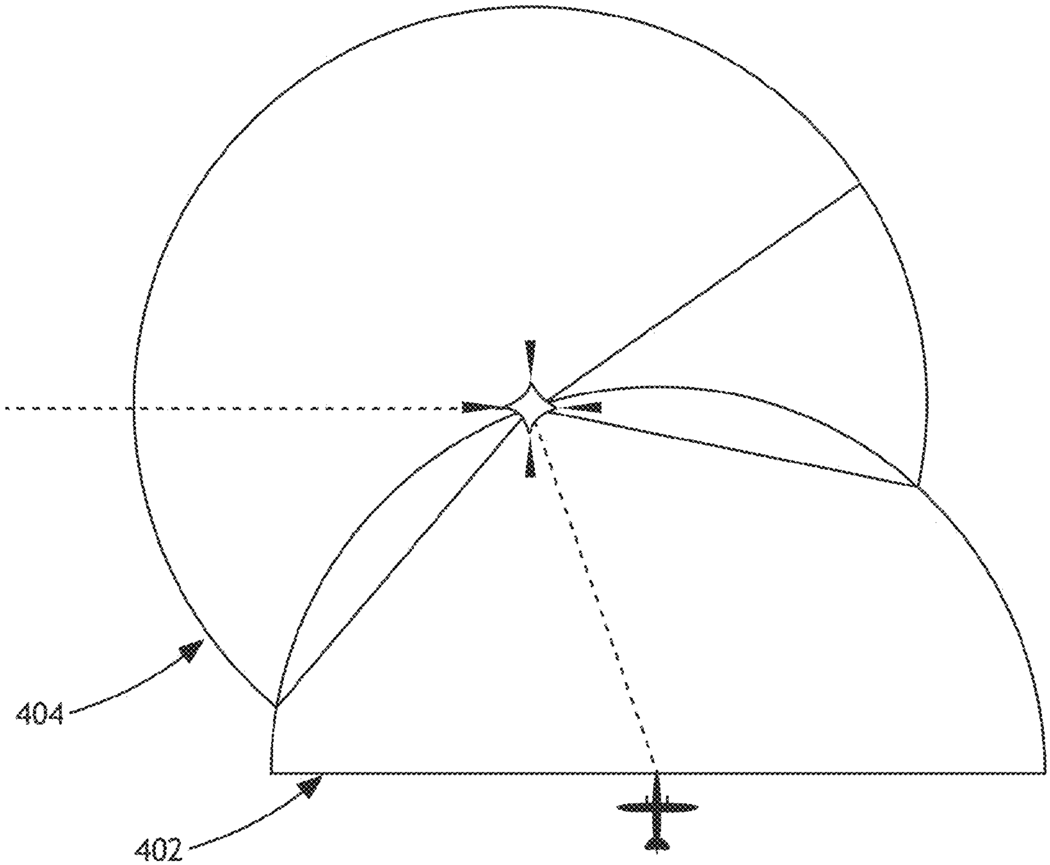
FIG. 18 is another illustration depicting an arc representation with a planned route.

It is noted that while clipping bars are utilized in the various space-time consolidated graphical representations 302 described above, such clipping bars may be removed to provide an alternative representation referred to as the arc representation. FIG. 15 is an example depicting an arc representation utilized for displaying weather information without the restrictions of the clipping bars. FIGS. 16 through 18 provide more specific details of the arc representation.

Referring to FIG. 16, space-time consolidated weather information is shown along equal time arcs. The inner arcs are shown for illustrative purposes. The arcs represent the time it takes to travel from the current position to the edge of the arc. Similar to the space-time consolidation process illustrated in FIGS. 9 and 10, which project weather conditions onto a particular path, arc projected weather is sliced into small time elements and are projected along the equal time arcs.

Also similar to the graphical representations previously described, the arc representation may be displayed in both the heading mode or the on-route mode. FIG. 17 shows an exemplary scenario where the aircraft is off route flying a heading with no flight plan interception. The arc is shown +/−90 degrees from the current heading. The arc may extend based on a time parameter or a distance parameter. For instance, the arc may extend to a distance based upon the duration of hazard detection and/or speed projections. It is contemplated, however, that the specific angular span of the arc and its projected time frame may be adjustable and may vary without departing from the broad scope of the inventive concepts disclosed herein.

FIG. 18 shows an arc representation along multiple waypoints. The outward edge of the first arc 402 may extend to the first waypoint. At the waypoint intersection a new arc 404 is created. The time instance at the origin of the second arc 404 may correspond to the edge of the first arc 402. The second arc 404 may extend to 20 minutes from the current aircraft position, and the second arc 404 may extend angularly to intersect the first arc. Weather information to be shown in areas overlapping in both arcs may be filtered, with the most intense return shown in such areas. Additional arcs may be created in a similar manner, and different colors may be associated with different arcs to visually distinguish them. Alternatively, the predictive weather information at a given range interval may be shown based on a time instance that the aircraft is predicted to reach that range interval while traveling along the flight path.

Figure 19:
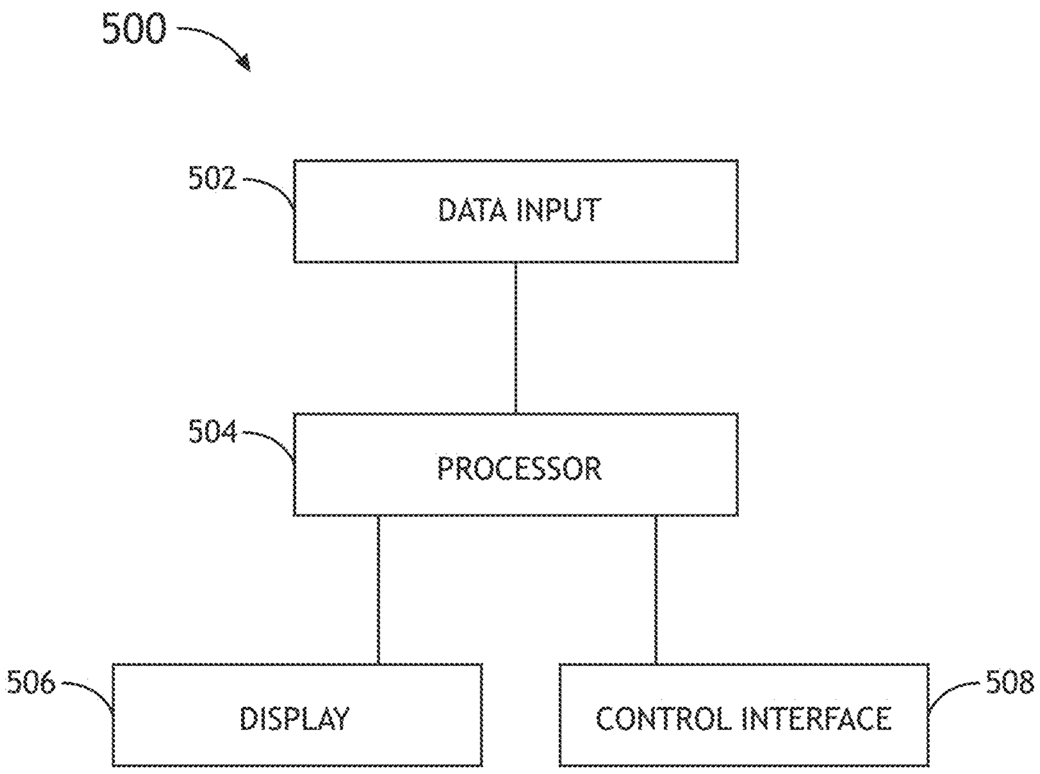
FIG. 19 is a block diagram depicting an embodiment of a system for displaying a condition of concern relative to a vehicle.

Referring now to FIG. 19, a block diagram depicting an embodiment of a system 500 for displaying a condition of concern relative to a vehicle is shown. It is contemplated that the system 500 may be positioned onboard the vehicle (e.g., an aircraft). Alternatively and/or additionally, the system 500 may be positioned externally to the vehicle (e.g., on the ground) and may communicate with the vehicle via wireless communication devices such as datalink or the like. The system 500 may also be utilized by an operator on the ground (e.g., ground dispatch) for monitoring the flight routes and hazards associated with multiple aircraft. It is to be understood that while weather conditions are referenced in the examples described herein as a particular type of condition of concern, such references are merely exemplary. Embodiments of the inventive concepts disclosed herein may be applicable to various other types of conditions, such as traffic conditions, flight restrictions (TFRs), Notice to Airmen (NOTAMs), or congested airspace conditions without departing from the broad scope of the inventive concepts disclosed herein.

In some embodiments, data devices 502 may be utilized to gather relevant data to be processed by a processor 504. Data devices 502 may include various sensors, antennas, or radars onboard an aircraft. For example, uplinked data and/or data obtained using on-board radars/sensors may be utilized to provide data regarding a particular condition of concern to be processed by the processor 504.

The processor 504 may be implemented as a dedicated processing unit, or as an add-on to existing systems onboard the aircraft. Alternatively, the processor 504 may be configured as an integrated component of an existing system, such as the flight management system or various other types of avionics. The processor 504 may be configured to process the received data input and provide predictions (e.g., weather forecasts) based on the received data input. The processor 504 may also be configured to access information regarding the planned route which the aircraft is set to execute, allowing the processor 504 to take into account the positional and movement information of both the aircraft and the condition of concern (e.g., a storm) to identify any potential hazardous segments along the planned route of the aircraft.

In the event that one or more potential hazardous segments are identified along the planned route of the aircraft, the identified potential hazardous segments may be displayed utilizing a display device 506. The display device 506 may be implemented as a dedicated display or a visual indicator. Alternatively, the display device 506 may be configured as an integrated component of the cockpit display system on board the aircraft.

It is contemplated that the display device 506 may be configured to display the various graphical representations previously described, including the time-adjustable graphical representation, the space-time consolidated graphical representation, and/or the arc representation. The display device 506 may be further configured to serve as a part of the human machine interface that enables a user (may also be referred to as a pilot or an operator) to engage the various reroute processes (as previously described) through a control interface 508.

It is also contemplated that the reroute process may be automated. For instance, in certain embodiments, the processor 504 may utilize automation or decision support software to create a new route including: lateral recommendation, new route (waypoint), vector (new heading), vertical deviation (altitude), or new speed along a flight plan leg. The new route (waypoints, headings, altitudes, and/or speeds) may be computed automatically by a route planner or route optimization decision support function, and may take into account the time, potential hazards, fuel consumption, performance and other considerations. The new computed conflict free route may be displayed, along with the current route, and the weather threats that are impacting the current route. In this manner, the user may be provided with information on the display device 506 that includes the recommended route generated by the processor 504 (e.g., utilizing automation or decision support), threat assessment of the current route (e.g., depicted to the user using the consolidated weather pattern projection), as well as the rationale as to why a new route is recommended. The user may review the recommended route, and make modifications to the recommended route, prior to execution.

Figure 20:
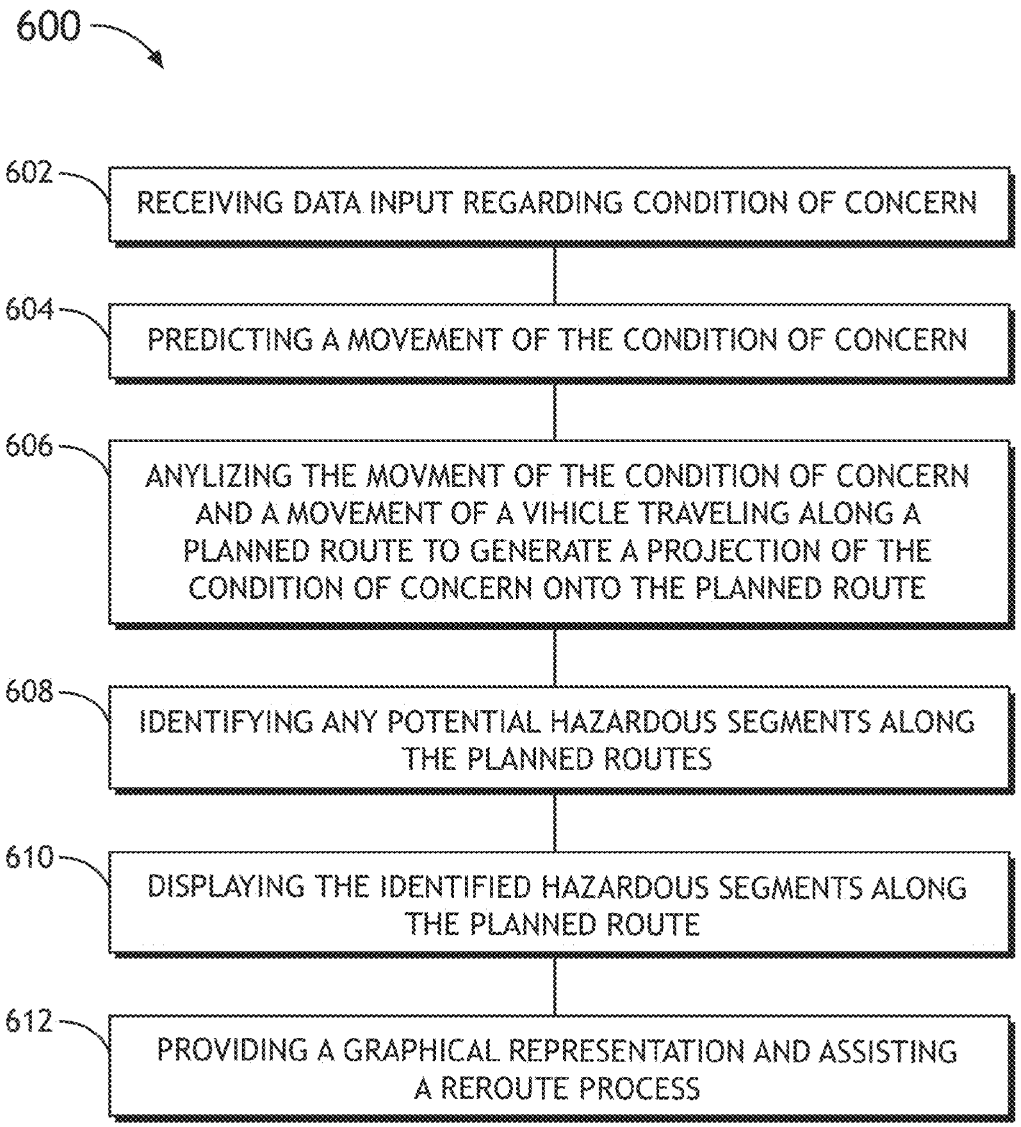
FIG. 20 is a block diagram depicting an embodiment of a method for displaying a condition of concern relative to a vehicle.

Referring now to FIG. 20, a flow diagram depicting an embodiment of a method 600 for displaying a condition of concern relative to a vehicle is shown. Once relevant data input regarding a particular condition of concern is obtained in a step 602, a step 604 may process the data input and predict the movement of that particular condition. The step 604 may also be utilized to predict the intensity of that particular condition when applicable. Subsequently, a step 606 may analyze the predicted movement of that particular condition with respect to the movement of the vehicle along its planned route to generate a projection of the condition onto the planned route. This projection may provide a visual representation of the conditions that the vehicle is predicted to encounter if the vehicle continues to travel according to the planned route. This projection may also be utilized to identify any potential hazardous segments along the planned route of the vehicle in a step 608.

In some embodiments, if any segment along the planned route of the vehicle is identified as potentially hazardous, that particular segment may be displayed in a step 610. It is contemplated that additional information may also be displayed in the step 610. For instance, the predicted position of the particular condition of concern may be displayed in a time-adjustable graphical representation, allowing the user to visualize the position of the condition of concern by manually or automatically adjusting a time reference. Alternatively/additionally, the projection of the condition of concern onto the planned route of the vehicle may be displayed in a space-time consolidated graphical representation, allowing the user to visualize the conditions that the vehicle is predicted to encounter if the vehicle travels according to the planned route. It is contemplated that arc representations as previously described may also be displayed. Furthermore, the user may switch between the different graphical representations described herein to perform his/her own visual analysis.

It is contemplated that the method 600 may further include steps 612 to assist reroute processes. A new route may be entered by a user utilizing waypoints, headings, altitudes and/or speeds. Alternatively and/or additionally, a new route may be generated by a route planner or a route optimization decision system. Regardless of the specific input method, the new route is analyzed in the same manner as the analysis performed on the original planned route. That is, the predicted movement of the particular condition of concern (e.g., the storm) is analyzed with respect to the movement of the vehicle along the new route, and conditions that the vehicle is predicted to encounter if the vehicle starts to travel according to the new route is projected onto the new route. As previously described, the movements of the vehicle may be predicated based on weather conditions (e.g., winds), aircraft performance predictions and other constraints (e.g., speed or altitude). This analysis allows potential hazardous segments along the new route to be identified, providing an effective graphical interface to plan different routes around the condition of concern.

Furthermore, it is contemplated that flight plan anomalies such as holds, discontinuities, projections past the end of the flight plan, as well as other types of anomalies may occur in certain situations. For example, an aircraft may be put into a hold so it can wait for traffic or weather to clear out or just as a way to reverse direction of flight in a more confined geographical area. Normally, the assignment of a hold is supposed to include an "Expect Further Clearance (EFC) Time", which is set to let the flight crew know how long they are supposed to fly in the holding pattern (e.g., a racetrack shaped pattern). In reality, however, the flight crew may not receive the EFC time, which makes the prediction of the movement of the aircraft difficult. In the event that the EFC time is not received, the vehicle may be assumed to continue its holding pattern until the EFC time is received or the hold is cleared, and the prediction and projection processes in accordance with embodiments of the present disclosure may be carried out based on this assumption.

Discontinuity is another example where flight plan anomalies may occur. A discontinuity happens when a flight management system does not know how to close a gap between two different portions or procedures in a flight plan. In the event that a discontinuity occurs in a flight plan, the prediction and projection processes may stop producing predictions at the point of the discontinuity. Alternatively, a direct path may be assumed across the discontinuity, and the prediction and projection processes may be carried out based on this assumption.

In another example, a flight plan normally includes some level of termination. Usually the termination is at an airport and, when known, a specific runway. Published approaches to a runway may include what is known as a missed approach procedure, which is a contingency plan in case something were to go wrong during the approach. These missed approach segments usually have to be activated to be seen on the maps or specifically selected for viewing on a map. In the event that a missed approach segment is activated or selected for viewing, the prediction and projection processes may include the missed approach segment as well. In certain situations, if it is determined/assumed that the aircraft may not be able to land, a long (or perpetual) hold time may be assumed and reflected on the prediction/projection results as well.

It is to be understood that the flight plan anomalies described above are merely exemplary. It is contemplated that the prediction and projection processes in accordance with embodiment of the inventive concepts described herein may be configured to handle various other types of flight plan anomalies without departing from the broad scope of the inventive concepts disclosed herein.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that embodiments of the inventive concepts described in the present disclosure are not limited to any underlying implementing technology. Embodiments of the inventive concepts of the present disclosure may be implemented utilizing any combination of software and hardware technology and by using a variety of technologies without departing from the broad scope of the inventive concepts or without sacrificing all of their material advantages.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:

predicting, utilizing one or more processors, a movement of a condition of concern, the condition of concern comprising at least one of a weather condition, an aircraft traffic condition, a flight restriction condition, a notice to airmen condition, or a congested airspace condition;

analyzing, utilizing the one or more processors, the movement of the condition of concern and a movement of a vehicle traveling along a planned route to generate a projection indicating a space-time consolidated visual representation of the condition of concern onto the planned route, wherein the space-time consolidated visual representation indicates conditions the vehicle is predicted to encounter at a plurality of future positions along the planned route to be traversed at specific future times as the vehicle traverses along the planned route;

determining, utilizing the one or more processors, whether a portion of the planned route to be traversed is potentially hazardous based on the projection of the condition of concern; and visually identifying, utilizing an electronic display, the portion of the planned route to be traversed that is potentially hazardous to a user.

2. The method of claim 1, further comprising:

receiving a new route for the vehicle;

analyzing the movement of the condition of concern and the movement of the vehicle traveling along the new route to generate a new projection of the condition of concern onto the new route, wherein the new projection indicates conditions the vehicle is predicted to encounter at a plurality of positions along the new route;

determining whether a portion of the new route is potentially hazardous based on the new projection of the condition of concern; and visually identifying the portion of the new route that is potentially hazardous to a user.

3. The method of claim 2, wherein the new route for the vehicle is received based on at least one of: a user specified waypoint, a user specified heading, a user specified altitude, and a user specified speed.

4. The method of claim 2, wherein the new route for the vehicle is received based on at least one of: a system generated waypoint, a system generated heading, a system generated altitude, and a system generated speed.

5. The method of claim 1, further comprising:

receiving a time reference; and displaying a predicted location of the condition of concern based on the time reference.

6. The method of claim 5, wherein the time reference is user specified.

7. The method of claim 5, wherein the time reference is determined base on a user specified waypoint.

8. The method of claim 1, wherein the space-time consolidated visual representation of the projection is configured to depict the projection within a certain distance around the planned route.

9. A method, comprising:

predicting, utilizing one or more processors, a movement of a condition of concern, the condition of concern comprising at least one of a weather condition, an aircraft traffic condition, a flight restriction condition, a notice to airmen condition, or a congested airspace condition;

analyzing, utilizing the one or more processors, the movement of the condition of concern and a movement of a vehicle traveling along a planned route to generate a projection indicating a space-time consolidated visual representation of the condition of concern onto the planned route, wherein the space-time consolidated visual representation indicates conditions the vehicle is predicted to encounter at a plurality of future positions along the planned route to be traversed at specific future times;

determining, utilizing the one or more processors, whether a portion of the planned route to be traversed is potentially hazardous based on the projection of the condition of concern;

visually identifying, utilizing an electronic display, the portion of the planned route to be traversed that is potentially hazardous to a user; and selectively displaying one of:

a predicted location of the condition of concern based on a specified time reference; and the space-time consolidated visual representation of the conditions the vehicle is predicted to encounter at the plurality of positions along the planned route to be traversed at specific future times.

10. The method of claim 9, further comprising:

receiving a new route for the vehicle;

analyzing the movement of the condition of concern and the movement of the vehicle traveling along the new route to generate a new projection of the condition of concern onto the new route, wherein the new projection indicates conditions the vehicle is predicted to encounter at a plurality of positions along the new route;

determining whether a portion of the new route is potentially hazardous based on the new projection of the condition of concern; and visually identifying the portion of the new route that is potentially hazardous to a user.

11. The method of claim 10, wherein the new route for the vehicle is received based on at least one of: a user specified waypoint, a user specified heading, a user specified altitude, and a user specified speed.

12. The method of claim 10, wherein the new route for the vehicle is received based on at least one of: a system generated waypoint, a system generated heading, a system generated altitude, and a system generated speed.

13. The method of claim 10, further comprising:

displaying a visual representation of the new projection indicating conditions the vehicle is predicted to encounter at the plurality of positions along the new route.

14. The method of claim 9, wherein the time reference is user specified.

15. The method of claim 9, wherein the time reference is determined base on a user specified waypoint.

16. The method of claim 9, wherein the visual representation of the projection is configured to depict the projection within a certain distance around the planned route.

17. A system, comprising:

a processor configured to:

predict a movement of a condition of concern, the condition of concern comprising at least one of a weather condition, an aircraft traffic condition, a flight restriction condition, a notice to airmen condition, or a congested airspace condition;

analyze the movement of the condition of concern and a movement of a vehicle traveling along a planned route to generate a projection indicating a space-time consolidated visual representation of the condition of concern onto the planned route, wherein the space-time consolidated visual representation indicates conditions the vehicle is predicted to encounter at a plurality of future positions along the planned route to be traversed at specific future times; and determine whether a portion of the planned route to be traversed is potentially hazardous based on the projection of the condition of concern; and a display device configured to display a graphical representation to a user, the graphical representation includes:

a visual indication of the portion of the planned route that is potentially hazardous; and one of: a predicted location of the condition of concern based on a specified time reference; and the space-time consolidated visual representation of the conditions the vehicle is predicted to encounter at the plurality of positions along the planned route to be traversed at specific future times.

18. The system of claim 17, further comprising:

a control interface configured to receive a new route for the vehicle, wherein upon receiving the new route, the processor analyzes the movement of the condition of concern and the movement of the vehicle traveling along the new route to generate a new projection of the condition of concern onto the new route, the processor further determines whether a portion of the new route is potentially hazardous based on the new projection of the condition of concern, and the display device updates the graphical representation to include a visual indication of the portion of the new route that is potentially hazardous.

19. The system of claim 17, wherein the processor is further configured to generate at least one new route and analyze whether said at least one new route contains any potentially hazardous portions to facilitate an automated reroute process.

* * * * *